United States Patent
Aggarwal et al.

(10) Patent No.: US 12,192,359 B2
(45) Date of Patent: Jan. 7, 2025

(54) AUTHORIZATION OF NETWORK REQUEST

(71) Applicant: Nokia Technologies Oy, Espoo (FI)

(72) Inventors: Chaitanya Aggarwal, Munich (DE); Anja Jerichow, Grafing bei Munich (DE); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 361 days.

(21) Appl. No.: 17/550,549

(22) Filed: Dec. 14, 2021

(65) Prior Publication Data

US 2022/0191028 A1 Jun. 16, 2022

(30) Foreign Application Priority Data

Dec. 16, 2020 (FI) ........................................ 20206313

(51) Int. Cl.
 *H04L 9/32* (2006.01)
(52) U.S. Cl.
 CPC .......... *H04L 9/3213* (2013.01); *H04L 9/3247* (2013.01)
(58) Field of Classification Search
 CPC .............................. H04L 9/3213; H04L 9/3247
 USPC ......................................................... 713/159
 See application file for complete search history.

(56) References Cited

U.S. PATENT DOCUMENTS

| | | | | |
|---|---|---|---|---|
| 2011/0170532 A1* | 7/2011 | Tchepnda | ............... | H04W 12/06 370/338 |
| 2013/0191884 A1* | 7/2013 | Leicher | ................... | H04L 63/08 726/4 |
| 2019/0007212 A1* | 1/2019 | Neve de Mevergnies | ................... | H04L 9/3226 |
| 2020/0136825 A1* | 4/2020 | Gupta | ................. | H04L 41/0895 |
| 2020/0319873 A1* | 10/2020 | Kaartinen | ............. | H04L 41/082 |
| 2020/0351090 A1* | 11/2020 | Gardner | ............. | H04L 9/3247 |
| 2021/0250172 A1* | 8/2021 | Choyi | ................... | H04L 9/3239 |

FOREIGN PATENT DOCUMENTS

WO 2020/220783 A1 11/2020
WO 2020/221219 A1 11/2020

OTHER PUBLICATIONS

Extended European Search Report received for corresponding European Patent Application No. 21212506.6, dated May 13, 2022, 7 pages.
"Integrity protection of service request in indirect communication", 3GPP TSG-SA3 Meeting #100e, S3-202186, Nokia, Aug. 17-28, 2020, 3 pages.

(Continued)

*Primary Examiner* — Moeen Khan
(74) *Attorney, Agent, or Firm* — Barta Jones, PLLC

(57) ABSTRACT

According to an example aspect of the present invention, there is provided an apparatus configured at least to: receive, from a service communication proxy, a request for an access token which authorizes access to a service at a network function provider, transmit an authorization token to the service communication proxy, the authorization token being specific to the request, and provide the access token to the service communication proxy responsive to determining that a cryptographic signature of a network function consumer on a signed version of the authorization token, received in the apparatus from the service communication proxy, is correct. The apparatus may work in a network serving user equipments, for example.

8 Claims, 7 Drawing Sheets

(56) References Cited

OTHER PUBLICATIONS

"Discussion paper on authentication in Indirect communication between NFs in deployments where NFc and NRF are hot directly connected with each other", 3GPP TSG SA WG3 (Security) Meeting #98bis-e, S3-200801, Agenda: 2.3, Nokia, Apr. 14-17, 2020, 5 pages.

"Access token ownership verification by the producer in indirect communication scenarios", 3GPP TSG-SA3 Meeting #98Bis-e, S3-200798, Nokia, Apr. 14-17, 2020, 7 pages.

Office action received for corresponding Finnish Patent Application No. 20206313, dated Apr. 4, 2022, 6 pages.

"3rd Generation Partnership Project; Technical Specification Group Core Network and Terminals; 5G System; Technical Realization of Service Based Architecture; Stage 3 (Release 17)", 3GPP TS 29.500, V17.0.0, Sep. 2020, pp. 1-82.

Hardt, "The OAuth 2.0 Authorization Framework", RFC 6749, Internet Engineering Task Force, Oct. 2012, pp. 1-76.

Office action received for corresponding Finnish Patent Application No. 20206313, dated Aug. 18, 2021, 7 pages.

"3rd Generation Partnership Project; Technical Specification Group Services and System Aspects; Security architecture and procedures for 5G system (Release 17)", 3GPP TS 33.501, V17.0.0, Dec. 2020, pp. 1-253.

* cited by examiner

AUTHORIZATION OF NETWORK REQUEST

FIELD

The present disclosure relates to security procedures, such as authorization procedures, in communication networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. However, technology disclosed herein has relevance also to wire-line communication networks.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to receive, from a service communication proxy, a request for an access token which authorizes access to a service at a network function provider, transmit an authorization token to the service communication proxy, the authorization token being specific to the request, and provide the access token to the service communication proxy responsive to determining that a cryptographic signature of a network function consumer on a signed version of the authorization token, received in the apparatus from the service communication proxy, is correct.

According to a second aspect of the present disclosure, there is provided an apparatus comprising at least one processing core, at least one memory including computer program code, the at least one memory and the computer program code being configured to, with the at least one processing core, cause the apparatus at least to provide a service request for a service at a network function provider to a service communication proxy, receive, from the service communication proxy, an authorization token specific to the service request, and provide the authorization token back to the service communication proxy after cryptographically signing the authorization token.

According to a third aspect of the present disclosure, there is provided an apparatus comprising at least one processing core, at least one memory including computer program code, the at least one memory and the computer program code being configured to, with the at least one processing core, cause the apparatus at least to provide to a network repository function a request for an access token which authorizes access to a service at a network function provider, provide to a network function consumer an authorization token received from the network repository function responsive to the request, the authorization token specific to the request and provide to the network repository function the authorization token received from the network function consumer and bearing a cryptographic signature of the network function consumer.

According to a fourth aspect of the present disclosure, there is provided a method, comprising receiving, in an apparatus, from a service communication proxy, a request for an access token which authorizes access to a service at a network function provider, transmitting an authorization token to the service communication proxy, the authorization token being specific to the request and providing the access token to the service communication proxy responsive to determining that a cryptographic signature of a network function consumer on a signed version of the authorization token, received in the apparatus from the service communication proxy, is correct.

According to a fifth aspect of the present disclosure, there is provided a method, comprising providing, by an apparatus, a service request for a service at a network function provider to a service communication proxy, receiving, from the service communication proxy, an authorization token specific to the service request, and providing the authorization token back to the service communication proxy after cryptographically signing the authorization token.

According to a sixth aspect of the present disclosure, there is provided a method, comprising providing, by an apparatus, to a network repository function a request for an access token, the access token authorizing access to a service at a network function provider, providing to a network function consumer an authorization token received from the network repository function responsive to the request, the authorization token specific to the request, and providing to the network repository function the authorization token received from the network function consumer and bearing a cryptographic signature of the network function consumer.

According to a seventh aspect of the present disclosure, there is provided an apparatus comprising means for receiving, in an apparatus, from a service communication proxy, a request for an access token which authorizes access to a service at a network function provider, transmitting an authorization token to the service communication proxy, the authorization token being specific to the request, and providing the access token to the service communication proxy responsive to determining that a cryptographic signature of a network function consumer on a signed version of the authorization token, received in the apparatus from the service communication proxy, is correct.

According to an eighth aspect of the present disclosure, there is provided an apparatus comprising means for providing, by an apparatus, a service request for a service at a network function provider to a service communication proxy, receiving, from the service communication proxy, an authorization token specific to the service request, and providing the authorization token back to the service communication proxy after cryptographically signing the authorization token.

According to a ninth aspect of the present disclosure, there is provided an apparatus comprising means for providing, by an apparatus, to a network repository function a request for an access token, the access token authorizing access to a service at a network function provider, providing to a network function consumer an authorization token received from the network repository function responsive to the request, the authorization token specific to the request, and providing to the network repository function the authorization token received from the network function consumer and bearing a cryptographic signature of the network function consumer.

According to a tenth aspect of the present disclosure, there is provided a non-transitory computer readable medium having stored thereon a set of computer readable instructions that, when executed by at least one processor, cause an apparatus to at least receive, from a service communication proxy, a request for an access token which authorizes access to a service at a network function provider, transmit an authorization token to the service communication proxy, the authorization token being specific to the request, and provide the access token to the service communication proxy responsive to determining that a cryptographic signature of a network function consumer on a signed version of the authorization token, received in the apparatus from the service communication proxy, is correct.

According to an eleventh aspect of the present disclosure, there is provided a non-transitory computer readable medium having stored thereon a set of computer readable instructions that, when executed by at least one processor, cause an apparatus to at least provide a service request for a service at a network function provider to a service communication proxy, receive, from the service communication proxy, an authorization token specific to the service request, and provide the authorization token back to the service communication proxy after cryptographically signing the authorization token.

According to a twelfth aspect of the present disclosure, there is provided a non-transitory computer readable medium having stored thereon a set of computer readable instructions that, when executed by at least one processor, cause an apparatus to at least provide to a network repository function a request for an access token, the access token authorizing access to a service at a network function provider, provide to a network function consumer an authorization token received from the network repository function responsive to the request, the authorization token specific to the request, and provide to the network repository function the authorization token received from the network function consumer and bearing a cryptographic signature of the network function consumer.

According to a thirteenth aspect of the present disclosure, there is provided a computer program configured to cause an apparatus to perform at least the following, when run: receive, from a service communication proxy, a request for an access token which authorizes access to a service at a network function provider, transmit an authorization token to the service communication proxy, the authorization token being specific to the request, and provide the access token to the service communication proxy responsive to determining that a cryptographic signature of a network function consumer on a signed version of the authorization token, received in the apparatus from the service communication proxy, is correct.

According to a fourteenth aspect of the present disclosure, there is provided a computer program configured to cause an apparatus to perform at least the following, when run: provide a service request for a service at a network function provider to a service communication proxy, receive, from the service communication proxy, an authorization token specific to the service request, and provide the authorization token back to the service communication proxy after cryptographically signing the authorization token.

According to a fifteenth aspect of the present disclosure, there is provided a computer program configured to cause an apparatus to perform at least the following, when run: provide to a network repository function a request for an access token, the access token authorizing access to a service at a network function provider, provide to a network function consumer an authorization token received from the network repository function responsive to the request, the authorization token specific to the request, and provide to the network repository function the authorization token received from the network function consumer and bearing a cryptographic signature of the network function consumer.

EMBODIMENTS

When using indirect communication in a service based architecture, wherein a service communication proxy acts on behalf of a network function consumer, requests to a network repository function may be authorized beforehand for service communication proxies, for network function consumers, or classes of network function consumers. On the other hand, specific requests may be separately authorized on a per-request basis, providing the technical benefit that more restrictive access may be provided to certain kinds of services, such as access to sensitive information or an ability to change system parameters in a communication network. Processes will be disclosed herein, where a network repository function issues a separate authorization token to be provided back to the network function consumer for signature, to obtain such authorization specific to an individual request in an indirect-communication setting. Thus the network is protected against, for example, a maliciously performing, compromised service communication proxy.

Figure 1:
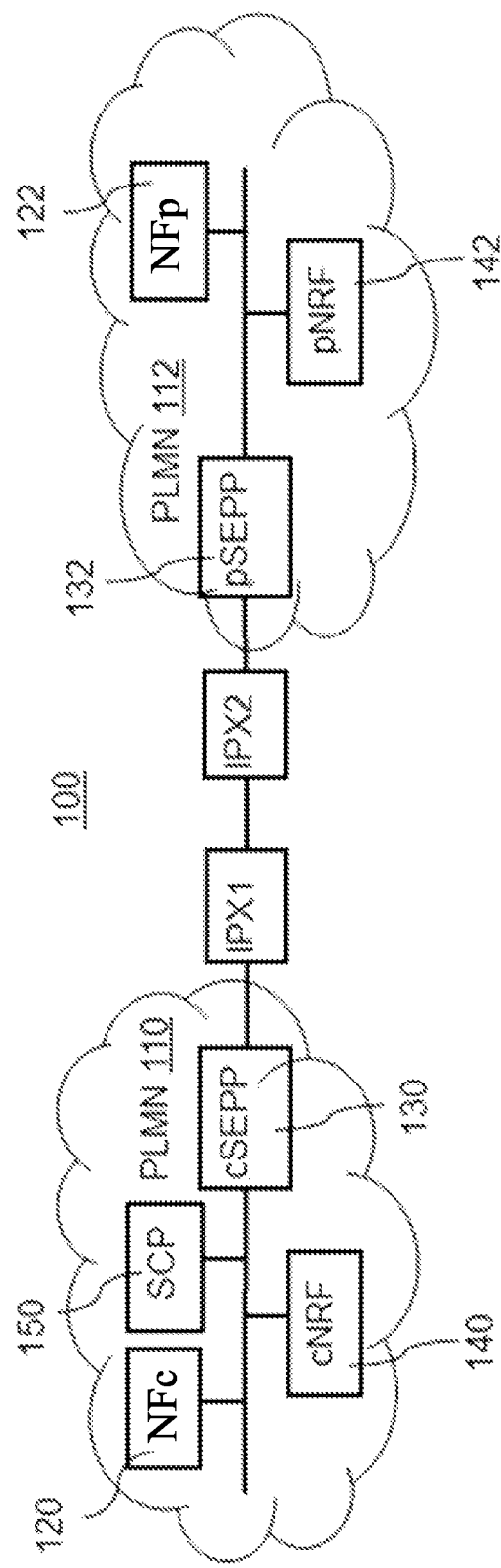
FIG. 1 illustrates an example system in accordance with at least some embodiments of the present invention.

FIG. 1 illustrates an example system in accordance with at least some embodiments of the present invention. The system comprises two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. Examples of such network functions include a resource control or management function, session management or control function, interworking, data management or storage function, authentication function or a combination of one or more of these functions.

In case of a third generation partnership project, 3GPP, fifth generation, 5G, system service based architecture, SBA, core network, NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCF, and an application function, AF. The PLMNs each may further comprise a security edge protection proxy, SEPP, 130, 132 configured to operate as a security edge node or gateway. The NFs may communicate with each other using representational state transfer application programming interfaces, for example. These may be known as Restful APIs. Further examples of NFs include NFs related to gaming, streaming or industrial process control. The system may comprise also nodes from 3G or 4G node systems, such as home subscriber server, HSS, and a suitable interworking function for protocol translations between e.g. diameter and REST API Json. While described herein primarily using terminology of 5G systems, the principles of the invention are applicable also to other communication networks using proxies as described herein, such as 4G networks and non-3GPP networks, for example.

While the example of FIG. 1 has two PLMNs 110, 122, in general at least some embodiments of the invention may be practiced in a single PLMN, which need not necessarily have SEPPs. In a two-PLMN case, in FIG. 1, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, communication between a service-consuming NF and a service-producing NF, henceforth referred to as NFc 120 and NFp 122. They may also be referred to as NF service consumer and NF service producer, respectively. As noted, the NFc and NFp may reside in the same PLMN or in different PLMNs.

A service communication proxy, SCP, 150 may be deployed for indirect communication between network functions, NFs. An SCP is an intermediate network entity to assist in indirect communication between an NFc and an NFp, including routing messages, such as, for example, control plane messages between the NFs, and optionally including discovering and selecting NFp on behalf of NFc or requesting an access token from the NRF or an Authorization Server on behalf of NFc to access the service of NFp.

Direct communication may be applied between NFc 120 and NFp 122 for an NF service, or NF service communication may be performed indirectly via SCP(s) 150. In direct communication, the NFc 120 performs discovery of the target NFp 122 by local configuration or via local NRF, cNRF 140. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF.

NF discovery and NF service discovery enable entities, such as NFc or SCP, to discover a set of NF instance(s) and NF service instance(s) for a specific NF service or an NFp type. The NFc and/or the SCP may be core network entities. The network repository function, NRF, may comprise a function that is used to support the functionality of NF and NF service registration, discovery, authorization and status notification. Additionally or alternatively, the NRF may be configured to act as an authorization server. The NRF may maintain an NF profile of available NFp entities and their supported services. The NRF may notify about newly registered, updated, or deregistered NFp entities along with its NF services to a subscribed NFc or SCP. An NRF may thus advise NFc entities or SCP concerning where, that is, from which NFp entities, they may obtain services they need. An NRF may be co-located together with an SCP, for example, run in a same computing substrate. Alternatively, NRF may be in a physically distinct node than an SCP or even hosted by a service provider.

In order for the NFc 120 or SCP 150 to obtain information about the NFp and/or NF service(s) registered or configured in a PLMN/slice, the NFc 120 or SCP 150 may initiate, based on local configuration, a discovery procedure with an NRF, such as cNRF 140. The discovery procedure may be initiated by providing the type of the NFp and optionally a list of the specific service(s) it is attempting to discover. The NFc 120 or SCP 150 may additionally or alternatively provide other service parameters, such as information relating to network slicing.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In some embodiments OAuth based service authorization and/or token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server, for example. The NFc may be an OAuth client and the NFp may operate as OAuth resource server, and they may be configured to support OAuth authorization framework as defined in RFC 6749, for example.

In general, a network support function such as an NRF may further be configured to act as an authorization server, and provide the NFc, or an SCP acting on behalf of the NFc, with a cryptographic access token authorizing the NFc to use the service provided by the NFp. In general, an NRF is a terminological example of a network support node. In general, an SCP is a terminological example of a proxy entity. The NFc or SCP may include the access token in a request message when requesting the service from the NFp, for example in an "authorization bearer" header. Such an access token may be referred to herein briefly as a token. For example, the NRF may act as an OAuth 2.0 authentication server. The token may comprise e.g. identifiers of the NFc, NRF and/or NFp, a timestamp and/or an identifier of the specific service which is authorised for the NFc with the token. The token may comprise a token identifier of itself, for example a serial number. The token identifier may uniquely identify the token. The token may be cryptographically signed using a private key of the NRF. A validity of such a cryptographic signature may be verified using the corresponding public key of the NRF, which the NFp may obtain in connection with registering with the NRF the service(s) it offers, for example. When the NFc contacts the NFp, it may present the access token, which the NFp may then verify, for example at least in part by using its copy of the public key of the NRF. Issuing an access token via a service communication proxy may comprise the proxy using the access token on behalf of the NFc with or without forwarding it to the NFc.

Figure 2:
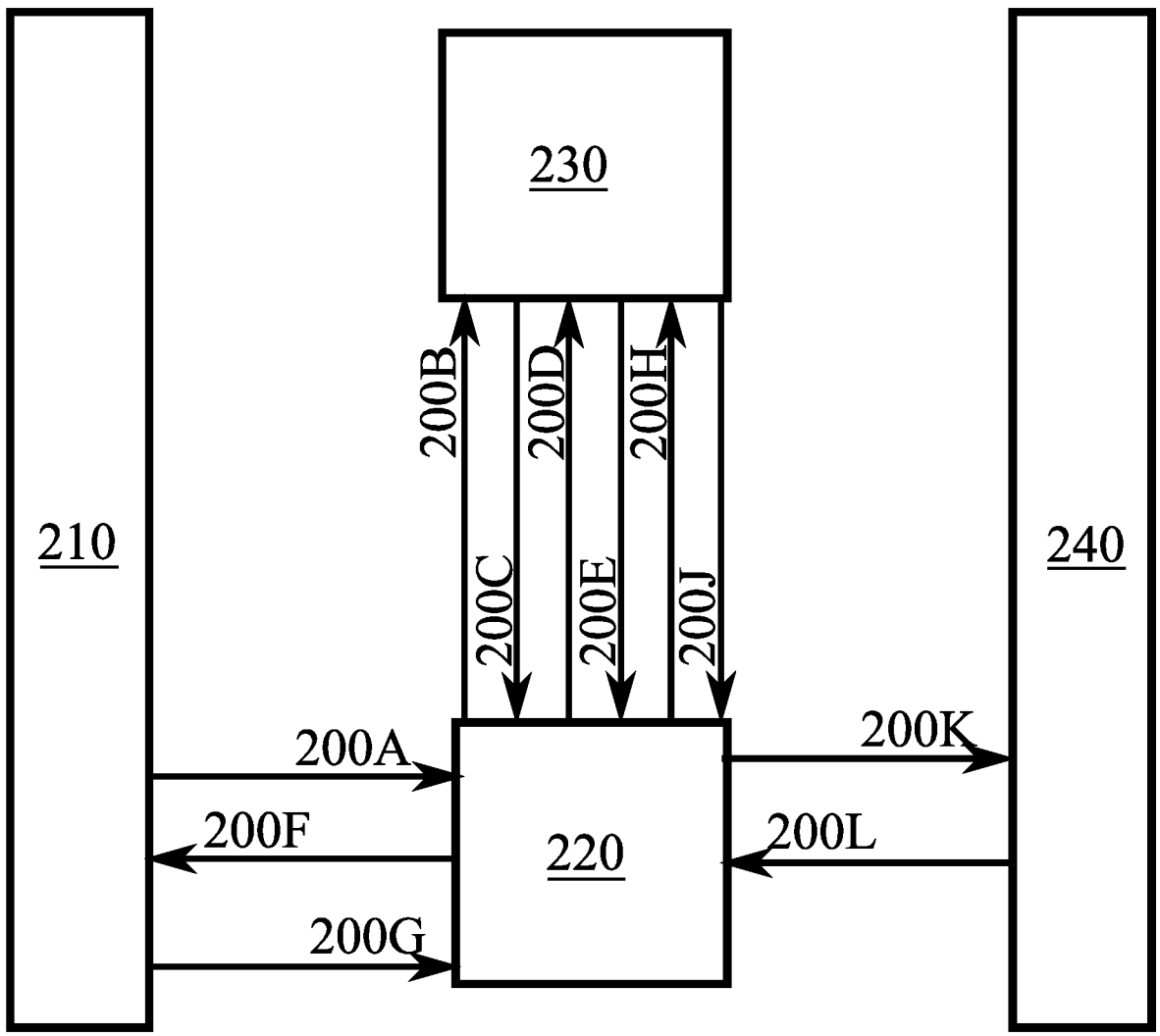
FIG. 2 illustrates an example system in accordance with at least some embodiments of the present invention.

FIG. 2 illustrates an example system in accordance with at least some embodiments of the present invention. NFc 210 wants to consume a service provided by NFp 240. Indirect communication via SCP 220 is used. In service request 200A the NFc 210 requests the service by transmitting the request to SCP 220. The service request may comprise a credential data element of NFc 210, such as, for example, a client credentials assertion, CCA, data element that enables the receiving NF, e.g. NRF or NFp, to authenticate NFc 210. A CCA data element may take the form of a javascript object notation, JSON, web token, for example. In some embodiments, the credential data element provided by NFc 210 in service request 200A includes information on at least one SCP authorized to act on behalf of NFc 210.

In response to service request 200A, SCP 220 issues a discovery message 200B to NRF 230. Discovery message 200B may describe the service NFc 210 seeks, based on information expressed in service request 200A. SCP 220 may include in discovery message at least one of: the credential data element of NFc 210, and/or a credential data element of SCP 220 itself.

Responsive to the discovery message 200B, or other messages from SCP 220 that relate to acting on behalf of NFc 210, NRF 230 may perform a determination as to whether SCP 220 is authorized to act on behalf of NFc 210.

Responsive to discovery message 200B, NRF 230 may, after determining whether SCP 220 is authorized, respond with a NF profile message 200C which may describe NFp entities which offer the service NFc 210 wishes to obtain. SCP 220 may select one of the NFp entities from the profile message 200C on behalf of NFc 210, and request an access token for the selected NFp in message 200D, which may comprise an identifier of the selected NFp, in the case of FIG. 2, this is NFp 240.

Responsive to access token request 200D, NRF 230 may determine that for this access token request 200D, SCP 220 needs to be separately authorized, that is, authorization by the NRF alone is not sufficient. For example, this determination may be based on a type of NFp and a type of service requested of the NFp. As a specific example, in case the NFp is a UDM node, a separate authorization may be configured as necessary for the specific access token request 200D. To implement the separate request-specific authorization, NRF 230 issues an authorization token in message 200E, which SCP 220 forwards to NFc 210 for signature, message 200F. NFc 210 analyses the authorization token and, to authorize SCP 220 to act on behalf of NFc 210 concerning the specific access token request 200D, the NFc 210 cryptographically signs the authorization token, and returns the signed authorization token to SCP in message 200G. Cryptographic signature may comprise a signature based on asymmetric encryption using a private key of NFc 210, or a signature based on symmetric encryption, such as a HMAC signature, for example. The analysis of the authorization token in NFc 210 may comprise checking that the authorization token carries a valid cryptographic signature of NRF 230. The SCP provides the signed authorization token to NRF 230 in message 200H, enabling NRF 230 to verify the cryptographic signature of NFc 210 on the authorization token using a public key of NFc 210, or a shared secret in case a signature based on symmetric encryption is used.

Responsive to the signature of NFc 210 on the authorization token being verified as correct, the NRF may provide the requested access token to SCP 220 in message 200J.

SCP 220 may then request the service from NFp 240 by sending to NFp 240 request message 200K. Request message 200K may comprise the access token received in SCP 220 in message 200J and, optionally, at least one credential data element, such as CCA, involved in the process. After verifying the access token, NFp 240 may provide the requested service in message(s) 200L, these results then being made available to the NFc 210 by SCP 220.

While described herein as responsive to access token request 200D, the NRF may alternatively or additionally provide an authorization token for signature by NFc 210 also as a response to message 200B. The authorization token, be it responsive to request 200D or 200B, may be dynamically generated by NRF 230 responsive to the request.

An example authorization token may comprise, for example, one, more than one, or all of the following information elements:
NF consumer instance identifier or NFc Set identifier
SCP instance identifier or FQDN
NRF instance identifier
Signing required by NFc=True
Validity
Scope: allowed service per NF type, e.g. Service Request API/resource
Additional scope: specific service operations and/or resources/data sets within service operations per NF type.

When the NFc signs the authorization token, it may perform the cryptographic signature over the contents of the authorization token. The validity parameter may define a validity time period during which the authorization token is valid, to guard against replay attacks. The scope parameter may describe the service allowed or requested, for example in combination with NFp type or without indication of NF type. The additional scope parameter, where present, may define the service allowed or requested with a different level of granularity, such as with reference to specific service operations or to use of specific data sets, optionally in combination with specific NFc type. In some embodiments, the authorization token includes a number which has been randomly or pseudo-randomly generated, to assign an identity to the specific authorization token to help prevent replay attacks.

Figure 3:
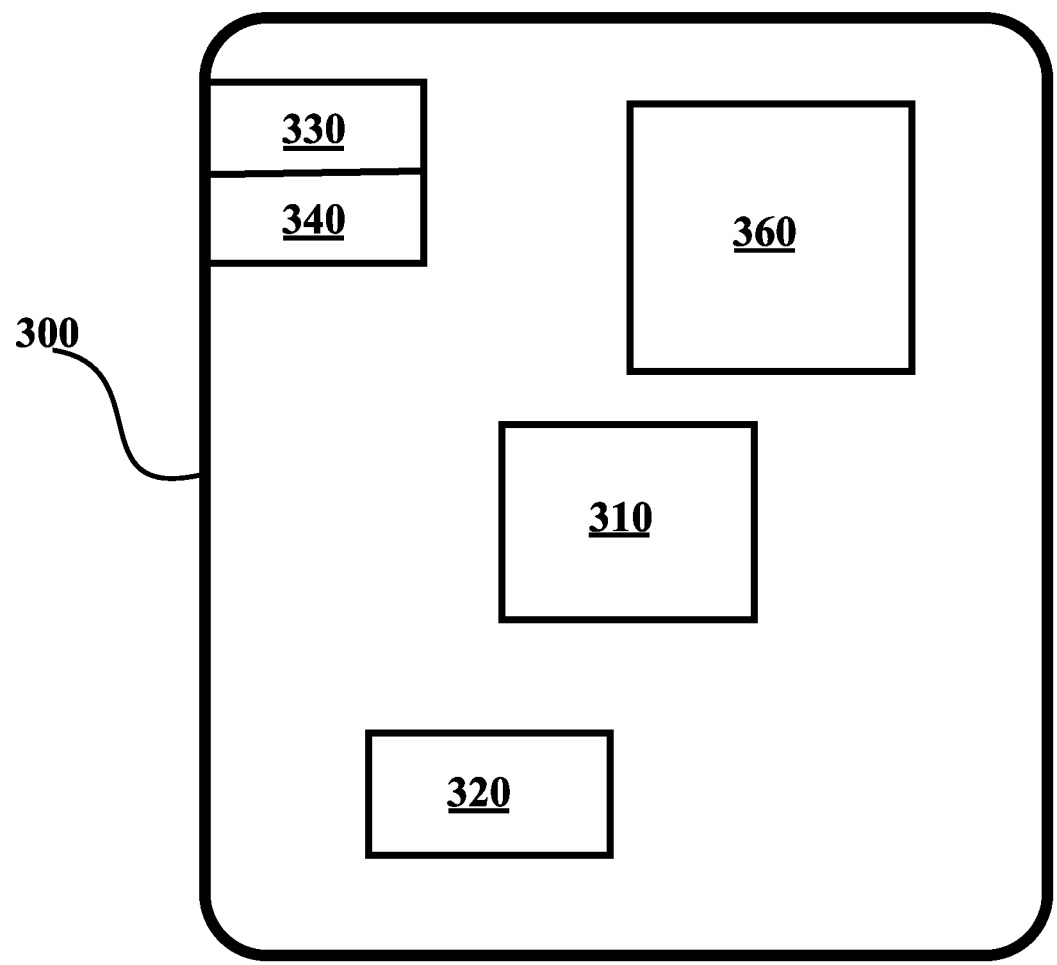
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, in applicable parts, a physical node running a NFc, an SCP and/or an NRF, for example. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices, AMD, Corporation. Processor 310 may comprise at least one AMD Epyc and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as receiving, transmitting and/or providing, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with a suitable messaging protocol.

Device 300 may comprise user interface, UI, 360. UI 360 may comprise at least one of a display, a keyboard and a touchscreen. A user may be able to operate device 300 via UI 360, for example to configure operating parameters, such as NRF policy information, for example.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively, to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively, to a serial bus, the receiver may comprise a parallel bus receiver.

Device 300 may comprise further devices not illustrated in FIG. 3. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
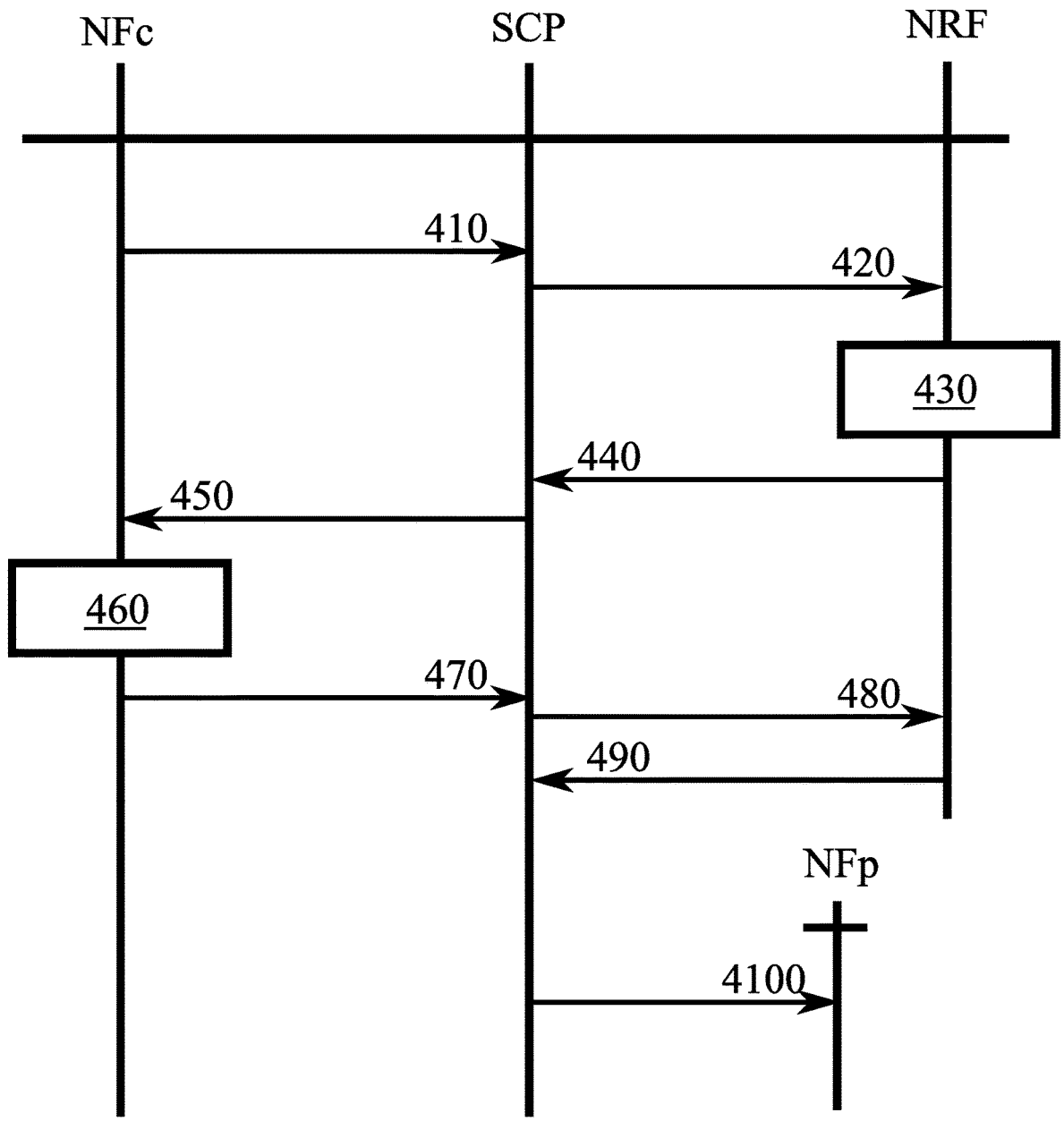
FIG. 4 illustrates signalling in accordance with at least some embodiments of the present invention.

FIG. 4 illustrates signalling in accordance with at least some embodiments of the present invention. On the vertical axes are disposed, on the left, the NFc, in the centre, the SCP and on the right, the NRF. Separately, in the lower right, is an axis representing the NFp. Time advances from the top toward the bottom.

In phase 410, the NFc requests a service provided by a NFp from the SCP. The request of phase 410 may comprise a CCA of the NFc. This request may include an additional flag for the NRF, requesting additional authorization of the SCP for this specific service request, or for an access token request stemming from this specific service request.

In phase 420, the SCP sends an access token request to the NRF. This request may include the CCA of the NFc and/or a CCA of the SCP, and in case the request of phase 410 included the additional flag for authorization of the specific service request, also the request of phase 420 may include this additional flag. This request may specify the NFp type the request relates to, and this request may specify a specific NFp instance that access is requested to. For example, the SCP may know the specific NFp instance beforehand, or the SCP may query for suitable NFp instances from the NRF, or other NRF(s).

In phase 430, the NRF analyses the request of phase 420. Either based on the additional flag provided by NFc or based on a separate criterion, the NRF decides whether using an authorization token is needed to authorize the specific request of phase 420. The separate criterion may comprise, for example, a target NFp type, wherein the NRF is configured to request separate authorization for requests relating to NFp types defined in advance. NFp entities may provide their type to NRF when registering with the NRF. For example, if the target NFp type is UDM, then separate authorization of SCP to request services on behalf of NFc, for example AMF, may be required for that particular request. As another example of a criterion, the NRF may be configured to request the separate authorization using the authorization token responsive to a determination that the same SCP has sent more than a predefined number of requests within a predetermined time period, which could indicate the SCP is acting maliciously. In some embodiments, the latter example relating to the number of requests from an SCP applies specifically to requests of a specific type, for example, relating to a specific NFp type. Thus the separate authorization of a specific request may be performed additionally to normal authorization of the SCP to act on behalf of the NFc.

In general, the NRF may decide the authorization token is needed responsive to one or both of the following: the additional flag from the NFc and an operational policy of the NRF.

In case the authorization token is determined to be needed, the NRF issues the authorization token, which it may dynamically generate, to the SCP in phase 440. The message of phase 440 may comprise a rejection error type message, such as a 4xx rejection error message, for example, which comprises the authorization token. The NRF may cryptographically sign the authorization token before sending it to the SCP. The authorization token may indicate the claims from the access token request of phase 420 that the authorization token seeks to explicitly and specifically authorize. In case the message of phase 440 is a rejection error type message, it may be a 4xx rejection error message, for example. An error code may be set in the message to "ADDITIONAL AUTHORIZATION REQUIRED FOR SCP". The authorization token may include a request to be signed by the NFc. The authorization token may further include an identifier of the NFc.

In phase 450, the SCP forwards the authorization token to the NFc. This may take place using an error message, for example. For example, it may be the same error message type as was used in phase 440 in embodiments where the message of phase 440 is an error message. The authorization token may be included in a custom header, for example. As one implementation option, the NFc may provide a callback URI to the SCP for delivering authorization tokens, and the SCP may use this callback URI to deliver the authorization token.

In phase 460, the NFc may decide whether to sign the authorization token. For example, if the NFc has not sent a service request, phase 410, corresponding to the authorization token, the NFc may decline to sign the authorization token. On the other hand if the authorization token corresponds to a service request recently sent by the NFc, the NFc may cryptographically sign the authorization token using its private key. In embodiments where the NRF has signed the authorization token before sending it, the NFc may verify the signature of the NRF, using a public key of the NRF. In case the NFc declines to sign the authorization token, it may simply discard the message of phase 450, or it may send an error message to the NRF. As the SCP may in that case be acting maliciously, the NFc may be configured to send the error message to the NRF directly, not via the SCP, as the SCP might discard the message in an attempt to conceal its malicious behaviour. In addition to a maliciously acting SCP, a man-in-the-middle, MITM, attack might try to send requests in the name of NFp to NRF. Also such MITM attacks would be thwarted by the authorization token, since the MITM attacker does not have the private key of the NFc and thus cannot sign the authorization token.

In phase 470, if the additional authorization token signing request is not declined, the NFc provides the signed authorization token to the SCP. The message of phase 470 may take the same format as the message of phase 410, for example. The message of phase 470 may contain the same token(s) as the message of phase 410, in addition to the signed authorization token. Correspondingly, in phase 480 the SCP provides the signed authorization token to the NRF. For example, the message of phase 480 may take the same format as the message of phase 420, for example an Nnrf_AccessToken_Get_Request. The message of phase 480 may contain the same token(s) as the message of phase 420, in addition to the signed authorization token.

After phase 480, the NRF may verify the signature of the NFc on the authorization token, using a public key of the NFc. The NRF may have this public key from a registration procedure of the NFc with the NRF, for example. The NRF may further verify tokens, such as CCAs, of the NFc and/or SCP, if present in the message of phase 420 and/or 480. Responsive to the token(s) being successfully verified, the NRF may provide the requested access token to the SCP in phase 490. The access token may comprise an OAuth access token, for example. This enables the SCP to request the service the NFc is interested in from the NFp, phase 4100, using the access token.

Overall, a single authorization token may thus be used to authorize a single access token request, and not more than one access token request.

Figure 5:
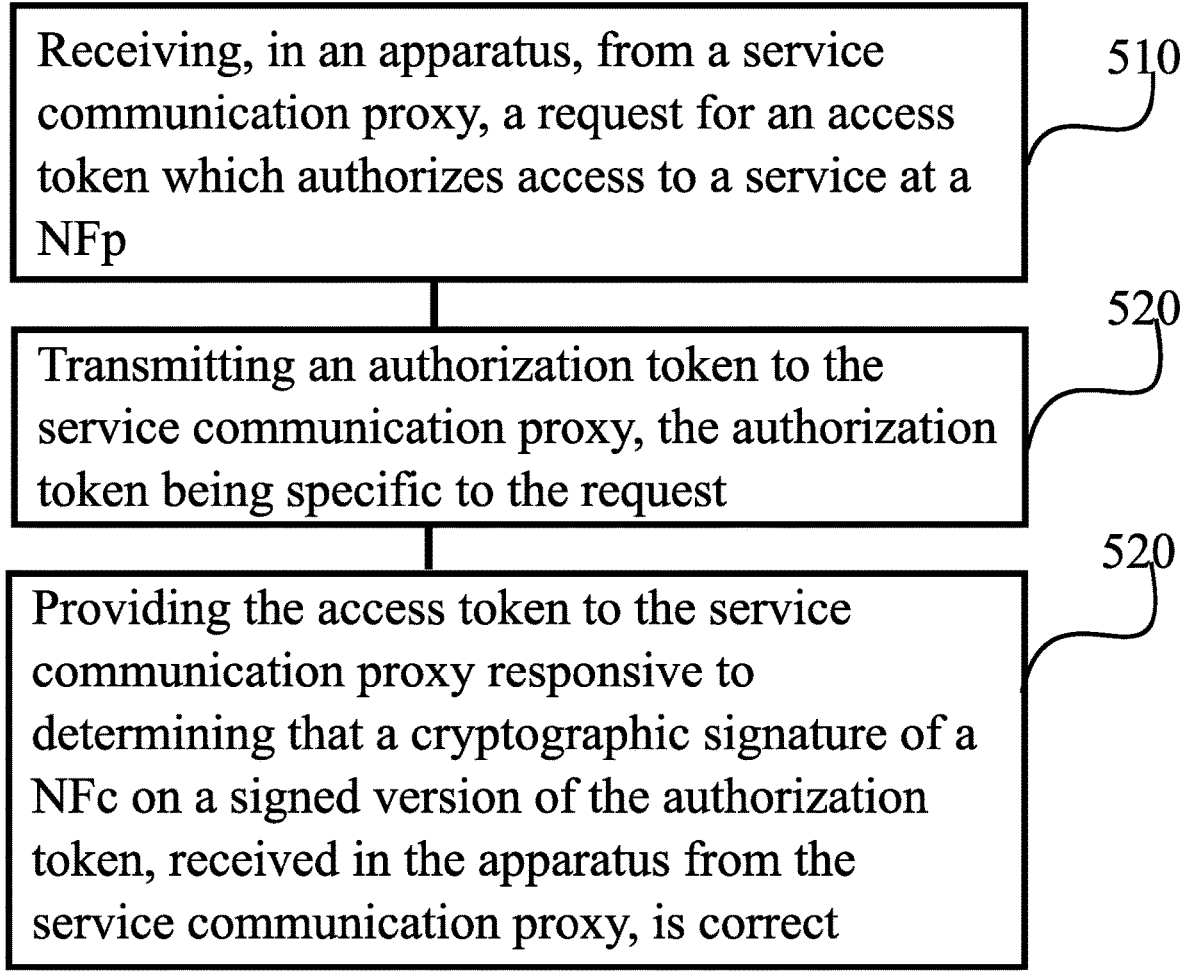
FIG. 5 is a flow graph of a method in accordance with at least some embodiments of the present invention.

FIG. 5 is a flow graph of a method in accordance with at least some embodiments of the present invention. The phases of the illustrated method may be performed in a network repository function, or in a control device configured to control the functioning thereof, when installed therein.

Phase 510 comprises receiving, in an apparatus, from a service communication proxy, a request for an access token which authorizes access to a service at a network function provider. Phase 520 comprises transmitting an authorization token to the service communication proxy, the authorization token being specific to the request. Phase 530 comprises providing the access token to the service communication proxy responsive to determining that a cryptographic signature of a network function consumer on a signed version of the authorization token, received in the apparatus from the service communication proxy, is correct.

Figure 6:
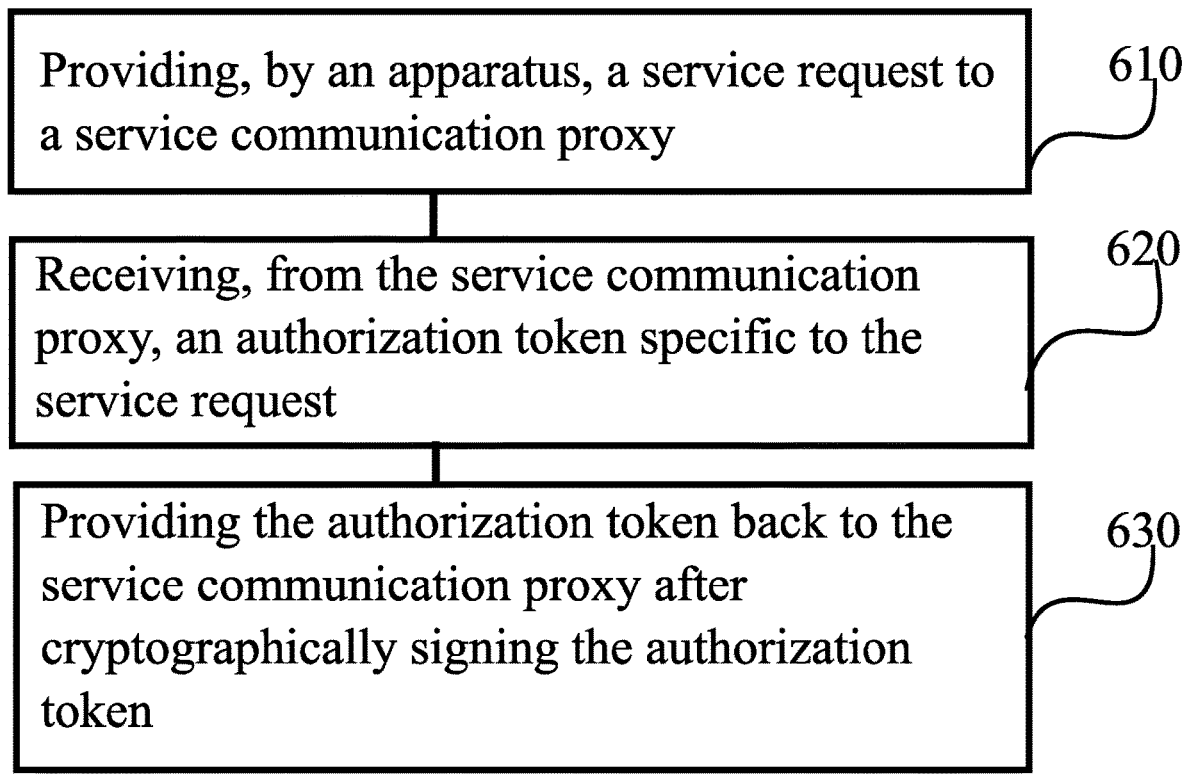
FIG. 6 is a flow graph of a method in accordance with at least some embodiments of the present invention.

FIG. 6 is a flow graph of a method in accordance with at least some embodiments of the present invention. The phases of the illustrated method may be performed in a network function consumer, or in a control device configured to control the functioning thereof, when installed therein.

Phase 610 comprises providing, by an apparatus, a service request for a service at a network function provider to a service communication proxy. Phase 620 comprises receiving, from the service communication proxy, an authorization token specific to the service request. Phase 630 comprises providing the authorization token back to the service communication proxy after cryptographically signing the authorization token. Such signing of the authorization token may be conducted with a private key of the apparatus, for example.

Figure 7:
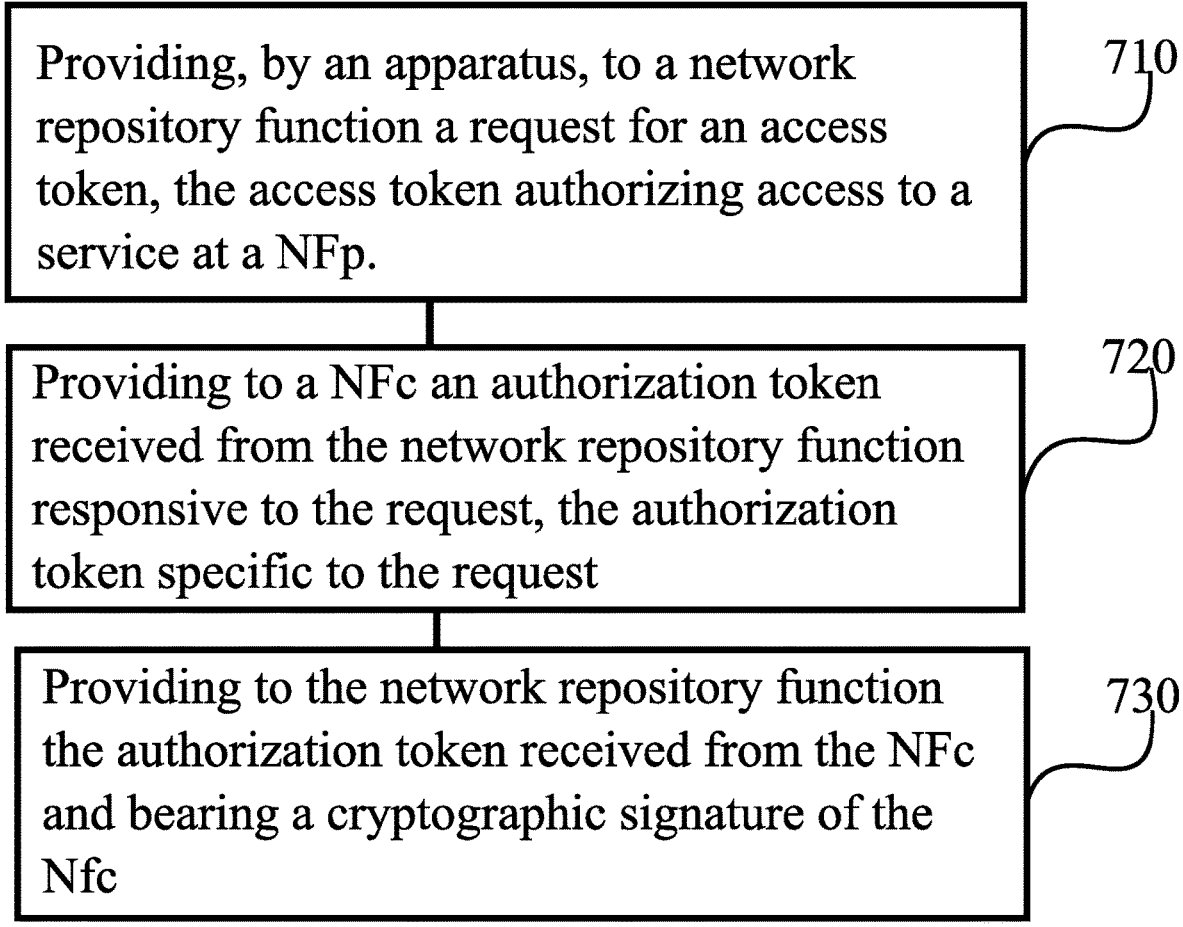
FIG. 7 is a flow graph of a method in accordance with at least some embodiments of the present invention.

FIG. 7 is a flow graph of a method in accordance with at least some embodiments of the present invention. The phases of the illustrated method may be performed in a service communication proxy, or more generally in a proxy entity, or in a control device configured to control the functioning thereof, when installed therein.

Phase 710 comprises providing, by an apparatus, to a network repository function a request for an access token, the access token authorizing access to a service at a network function provider. Phase 720 comprises providing to a network function consumer an authorization token received from the network repository function responsive to the request, the authorization token specific to the request. Finally, phase 730 comprises providing to the network repository function the authorization token received from the network function consumer and bearing a cryptographic signature of the network function consumer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communication network security.

ACRONYMS LIST

API application programming interface
FQDN fully qualified domain name
NFc network function consumer
NFp network function producer
NRF network repository function
SCP service communication proxy

What is claimed is:

1. An apparatus operating as network repository function comprising at least one processing core, at least one memory including computer program code, the at least one memory and the computer program code being configured to, with the at least one processing core, cause the apparatus at least to:

receive, from a service communication proxy, a discovery message describing a service requested by a network function consumer;

transmit, responsive to the discovery message a profile message describing network function provider entities which offer the service requested by the network function consumer, wherein the service communication proxy selects a network function provider from the profile message;

receive, from the service communication proxy, a request for an access token for the selected network function provider;

determine, responsive to receiving the request for the access token whether a separate authorization is needed for the service communication proxy based on at least one criterion, wherein the at least one criterion comprises whether an identity of the network function consumer is comprised in a list of network function consumer identities, and whether the network function provider is of a type for which authorization tokens shall be used;

transmit, responsive to determining that the separate authorization is needed, an authorization token, distinct from the access token, to the service communication proxy, the authorization token being specific to the request, wherein the separate authorization using the authorization token is needed in response to determination that the service communication proxy has sent more than a predefined number of requests within a predetermined time period and wherein the separate authorization is performed by a network function consumer by signing the authorization token using its private key and transmitting a signed authorization token to the service communication proxy;

verify, the signed authorization token received from the service communication proxy using a public key of the network function consumer;

and provide the access token to the service communication proxy responsive to verifying the signed authorization token which enables the network function provider to provide service requested by the network function consumer after validating the access token received from the service communication proxy.

2. The apparatus according to claim 1, wherein the at least one memory and the computer program code are configured to, with the at least one processing core, cause the apparatus to generate the authorization token responsive to receiving the request.

3. The apparatus according to claim 1, wherein the apparatus is configured to include in the authorization token a number which has been randomly or pseudo-randomly generated.

4. An apparatus operating as a network function consumer and comprising at least one processing core, at least one memory including computer program code, the at least one memory and the computer program code being configured to, with the at least one processing core, cause the apparatus at least to:

transmit a service request for a service at a network function provider to a service communication proxy, wherein the service request includes an additional flag for additional authorization of the service communication proxy for the request and wherein the service communication proxy selects a network function provider which offer the service requested by the network function consumer from a profile message distributed by a network repository function;

receive, from the service communication proxy, an authorization token specific to the service request, the authorization token distinct from an access token authorizing access to the service at the network function provider, wherein the network repository function is configured to request separate authorization using the authorization token in response to determination that the service communication proxy has sent more than a predefined number of requests within a predetermined time period and wherein the separate authorization is further based on at least one criterion, wherein the at least one criterion comprises whether an identity of the network function consumer is comprised in a list of network function consumer identities, and whether the network function provider is of a type for which authorization tokens shall be used;

provide the authorization token back to the service communication proxy after cryptographically signing the authorization token using private key, wherein the network repository function provides the access token the service communication proxy responsive to validating signature of the authorization token using public key, and wherein the authorization token comprises a validity period indication, an identity of an application programming interface of the service at the network function provider, scope, additional scope defining the scope at a different level of granularity from the scope and a resource identifier; and receive, access to the service from the network function provider responsive to network function provider validating the access token received from the service communication proxy.

5. The apparatus according to claim 4, wherein the authorization token further comprises at least one of: a network function consumer instance identifier of the apparatus, a network function consumer set identifier, a service communication proxy identifier, a network repository function identifier, an indication that a signature of the authorization token is requested from the apparatus.

6. The apparatus according to claim 4, wherein the at least one memory and the computer program code are configured to, with the at least one processing core, cause the apparatus to verify a cryptographic signature of the network repository function on the authorization token before signing the authorization token, and to reject the authorization token responsive to the cryptographic signature of the network repository function being incorrect.

7. A method, comprising:

receiving, in an apparatus, from a service communication proxy, a discovery message describing a service requested by a network function consumer;

transmitting, responsive to the discovery message a profile message describing network function provider entities which offer the service requested by the network function consumer, wherein the service communication proxy selects a network function provider from the profile message;

receiving, in the apparatus, from a service communication proxy, a request for an access token for the selected network function provider;

determining, responsive to receiving the request for the access token whether a separate authorization is needed for the service communication proxy based on whether an identity of the network function consumer is comprised in a list of network function consumer identities and whether the network function provider is of a type for which authorization tokens shall be used;

transmitting, responsive to determining that the separate authorization is needed, an authorization token, distinct from the access token, to the service communication proxy, the authorization token being specific to the request, wherein the separate authorization using the authorization token is needed in response to determination that the service communication proxy has sent more than a predefined number of requests within a predetermined time period, and wherein the separate authorization is performed by a network function consumer by signing the authorization token using its private key and transmitting a signed authorization token to the service communication proxy;

verifying, the signed authorization token received from the service communication proxy using a public key of the network function consumer;

and providing the access token to the service communication proxy responsive to verifying the signed authorization token which enables the network function provider to provide service requested by the network function consumer after validating the access token received from the service communication proxy.

8. A method, comprising:

providing, by an apparatus, a service request for a service at a network function provider to a service communication proxy, wherein the service communication proxy selects a network function provider which offer the service requested by the network function consumer from a profile message distributed by a network repository function;

receiving, from the service communication proxy, an authorization token specific to the service request, the authorization token distinct from an access token authorizing access to the service at the network function provider, wherein the network repository function is configured to request separate authorization using the authorization token in response to determination that the service communication proxy has sent more than a predefined number of requests within a predetermined time period, and wherein the separate authorization is further based on at least one criterion, wherein the at least one criterion comprises whether an identity of the network function consumer is comprised in a list of network function consumer identities, and whether the network function provider is of a type for which authorization tokens shall be used;

providing the authorization token back to the service communication proxy after cryptographically signing the authorization token using private key, wherein the network repository function provides the access token the service communication proxy responsive to validating signature of the authorization token using public key, and wherein the authorization token comprises a validity period indication, an identity of an application programming interface of the service at the network function provider, scope, additional scope defining the scope at a different level of granularity from the scope and a resource identifier; and receiving, access to the service from the network function provider responsive to network function provider validating the access token received from the service communication proxy.

\* \* \* \* \*